(12) United States Patent
Shao et al.

(10) Patent No.: US 10,372,806 B2
(45) Date of Patent: Aug. 6, 2019

(54) DATA DISPLAY TECHNIQUE FOR AGGREGATE DISPLAY OF RELATED DATA

(71) Applicant: International Business Machines Corporation, Armonk, NY (US)

(72) Inventors: Hua Shao, Beijing (CN); Yi Shen, Beijing (CN); Yu Wang, Beijing (CN); Xue Ying Zhang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 125 days.

(21) Appl. No.: 14/627,623

(22) Filed: Feb. 20, 2015

(65) Prior Publication Data
US 2015/0248395 A1   Sep. 3, 2015

(30) Foreign Application Priority Data
Feb. 28, 2014  (CN) .......................... 2014 1 0072683

(51) Int. Cl.
*G06F 17/24*  (2006.01)
*G06F 16/904*  (2019.01)

(52) U.S. Cl.
CPC .......... *G06F 17/245* (2013.01); *G06F 16/904* (2019.01)

(58) Field of Classification Search
CPC .................. G06F 17/245; G06F 17/30994
See application file for complete search history.

(56) References Cited

U.S. PATENT DOCUMENTS

| 8,943,142 | B1 * | 1/2015 | Simon ..................... H04L 67/10 709/205 |
| 9,015,572 | B2 * | 4/2015 | Lanza ................... G06F 17/246 707/754 |
| 2004/0044685 | A1 * | 3/2004 | Huynh .............. G06F 17/30592 |
| 2005/0223085 | A1 * | 10/2005 | Giles ....................... H04L 51/12 709/220 |
| 2006/0184889 | A1 * | 8/2006 | Molander ............. G06F 17/246 715/764 |
| 2007/0196028 | A1 * | 8/2007 | Kokemohr .............. G06T 11/00 382/254 |
| 2009/0144274 | A1 | 6/2009 | Fraleigh et al. |

(Continued)

FOREIGN PATENT DOCUMENTS

| CA | 2501254 A1 | 9/2005 |
| CN | 1723525 A | 1/2006 |

(Continued)

OTHER PUBLICATIONS

Bring selected rows to the top from the Jqgrid: http://stackoverflow.com/questions/8123825/bring-selected-rows-to-the-top-from-the-jqgrid; downloaded Feb. 20, 2015; pp. 3.

(Continued)

*Primary Examiner* — Howard Cortes
(74) *Attorney, Agent, or Firm* — Cantor Colburn LLP; Reza Sarbakhsh

(57) ABSTRACT

According to an aspect of the present disclosure, there is provided a system, a method, and/or a computer program product for data display, comprising: acquiring raw data content; determining a first set of data entries to be aggregately displayed from the raw data content; and in response to a request for an aggregate display, aggregately displaying the first set of data entries.

9 Claims, 12 Drawing Sheets

(56) References Cited

U.S. PATENT DOCUMENTS

| | | | | |
|---|---|---|---|---|
| 2009/0198566 | A1* | 8/2009 | Greenberg | G06Q 30/02 707/727 |
| 2009/0228826 | A1* | 9/2009 | Gilmore | G06F 17/30991 715/781 |
| 2009/0276692 | A1* | 11/2009 | Rosner | G06F 17/30498 715/227 |
| 2009/0319880 | A1* | 12/2009 | Collie | G06F 17/246 715/219 |
| 2010/0017699 | A1* | 1/2010 | Farrell | G06F 3/0482 715/227 |
| 2010/0228752 | A1* | 9/2010 | Folting | G06F 17/246 707/758 |
| 2011/0035653 | A1* | 2/2011 | Vigesaa | G06F 17/246 715/217 |
| 2011/0270876 | A1* | 11/2011 | Gill | G06F 17/30634 707/769 |
| 2012/0023449 | A1* | 1/2012 | Zabielski | G06F 17/246 715/825 |
| 2012/0159297 | A1* | 6/2012 | Peters | G06F 17/246 715/212 |
| 2014/0040747 | A1* | 2/2014 | Gardenfors | G06F 17/30064 715/728 |
| 2015/0066713 | A1* | 3/2015 | Burgain | G06Q 40/12 705/30 |

FOREIGN PATENT DOCUMENTS

| | | |
|---|---|---|
| CN | 101223520 A | 7/2008 |
| CN | 102346633 A | 2/2012 |

OTHER PUBLICATIONS

CN OA dated Sep. 18, 2017, Chinese application No. 201410072683.1, 7 pages.

* cited by examiner

How to view and compare the data of the same month in 1990, 2001 and 2008?

| Toolbar | | | | | |
|---|---|---|---|---|---|
| 1 | Jan-1990 | 7,235 | 6,919 | 2,403 | 1,9 |
| 2 | Feb-1990 ... | | | | |
| 3 | Mar-1990 ... | | | | |
| 4 | ... | | | | |
| 5 | | | | | |
| 6 | | | | | |
| 7 | | | | | |
| 8 | | | | | |
| 9 | | | | | |
| 10 | | | | | |
| 11 | | | | | |
| 12 | | | | | |
| 13 | Jan-1991 | 7,589 | 7,920 | 2,742 | 2,0 |

Page Down

| 133 | Jan-2001 | 7,082 | 6,133 | 1,973 | 1,7 |
|---|---|---|---|---|---|
| 134 | Feb-2001 ... | | | | |
| 135 | Mar-2001 ... | | | | |
| 136 | ... | | | | |

Page Down

| 217 | Jan-2008 | 7,589 | 7,920 | 2,742 | 2,0 |
|---|---|---|---|---|---|
| 218 | Feb-2008 ... | | | | |
| 219 | Mar-2008 ... | | | | |
| 220 | ... | | | | |

FIG.2

```
 1 var phonecatAnimations = angular.module('phonecatAnimations', ['ngAnimate']);
 2
 3 phonecatAnimations.animation('.phone', function() {
 4
 5   var animateUp = function(element, className, done) {
 6     if(className != 'active') {
 7       return;
 8     }
 9     element.css({
10       position: 'absolute',
11       top: 500,
12       left: 0,
13       display: 'block'
14     });
15
16     jQuery(element).animate({
17       top: 0
18     }, done);
19
20     return function(cancel) {
```

[Find | animate | 1/4 ∧ ∨ | All]

FIG.5E

```
 9* var animateUp = function(element, className, done) {
27* var animateDown = function(element, className, done) {
45* var animateLeft = function(element, className, done) {
63* var animateRight = function(element, className, done) {
70    if(className != 'active') {
71      return;
72    }
73    element.css({
74      position: 'absolute',
75      left: 0,
76      top: 0
77    });
78
79    jQuery(element).animate({
80      right: -500
81    }, done);
82
83    return function(cancel) {
84      if(cancel) {
85        element.stop();
```

FIG.5F

```
 9  element.css({
31  element.css({
52  element.css({
73  element.css({
74    position: 'absolute',
75    left: 0,
76    top: 0
77  });
78
79  jQuery(element).animate({
80    right: -500
81  }, done);
82
83  return function(cancel) {
84    if(cancel) {
85      element.stop();
86    }
87  };
88  }
89
```

FIG.5G

```
 9  element.css({
31  element.css({
52  element.css({
73  element.css({
74
75  Show  5  rows for each section
76           OK   Cancel
77
78
79  jQuery(element).animate({
80    right: -500
81  }, done);
82
83  return function(cancel) {
84    if(cancel) {
85      element.stop();
86    }
87  };
88  }
89
```

FIG.5H

```
element.css({
    position: 'absolute',
    top: 500,
    left: 0,
    display: 'block'
element.css({
    position: 'absolute',
    left: 0,
    top: 0
});
element.css({
    position: 'absolute',
    left: 500,
    top: 0
});
element.css({
    position: 'absolute',
    left: 0,
    top: 0
});
```

FIG.5I

DATA DISPLAY TECHNIQUE FOR AGGREGATE DISPLAY OF RELATED DATA

FOREIGN PRIORITY

This application claims priority to Chinese Patent Application No. 201410072683.1 filed 28 Feb. 2014, and all the benefits accruing therefrom under 35 U.S.C. § 119, the contents of which in its entirety are herein incorporated by reference.

BACKGROUND

The present disclosure relates to a data display technique, and more specifically, to a method and system for automatically aggregating display of related data, as well as the switch of the displayed data.

In the process of mass data analysis, specific data are compared to entries. For example, in the data table shown in FIG. 2, data of each month during a period from 1990 to 2008 is stored monthly. It might be a difficult task to compare data of 1990, 2001 and 2008 month by month. In such a case, at first data of January 1990 is retrieved and recorded. Then the data is scrolled through to data of January 2001, which is also recorded. Then that data is scrolled through to data of January 2008. By performing these operations data of January is obtained in these three years. Further, the operations must return to and continue with data of February 1990 iteratively to check month by month, which is not only time consuming but also difficult to intuitively display for the purpose of comparison.

A solution is provided in the background art in which data to be displayed is filtered with a data filtering function. However, such a function is generally applicable to specific tabular processing applications, and may not effectively filter data content such as text and program code. Further, filter keywords must be specified in advance for data filtering. For example, as to the table shown in FIG. 2, "January" must be specified as a keyword to filter the data entries in the table, to only display data entries containing the keyword "January" after filtering. After comparing data of January in various years, however, "February" must be specified as a keyword to filter the raw data again for display and so on, until 12 keywords (January to December) have been specified to compare and check data of each month of the three years.

SUMMARY

According to an aspect of the present disclosure, there is provided a method for data display, comprising: acquiring raw data content; determining a first set of data entries to be aggregately displayed from the raw data content; and in response to a request for an aggregate display, aggregately displaying the first set of data entries.

According to another aspect of the present disclosure, there is provided a data display system, comprising: acquisition means configured to acquire raw data content; determination means configured to determine a first set of data entries to be aggregately displayed from the raw data content; and display means configured to aggregately display the first set of data entries in response to a request for aggregate display.

According to another aspect of the present disclosure, there is provided a computer program product for data display, the computer program product comprising a computer readable storage medium having program instructions embodied therewith, the program instructions executable by a processor to cause the processor to perform: acquiring raw data content; determining a first set of data entries to be aggregately displayed from the raw data content; and in response to a request for an aggregate display, aggregately displaying the first set of data entries.

With the data display method and system provided herein, the desired data entries may be selectively and aggregately displayed from mass data. Further, a fast and flexible switch may be realized for data that is aggregately displayed in response to a change in requirement.

BRIEF DESCRIPTION OF THE DRAWINGS

Through the more detailed description of some embodiments of the present disclosure in the accompanying drawings, the above and other effects, features and advantages of the present disclosure will become more apparent, wherein the same reference generally refers to the same components in the embodiments of the present disclosure.

FIG. 2 shows a schematic diagram of a data table containing mass data from which several data entries are compared and checked;

FIGS. 5A-5I show schematic diagrams of operations in the data display method according to an embodiment (data tables and code documents);

DETAILED DESCRIPTION

Embodiments will be described in more detail with reference to the accompanying drawings, in which the embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
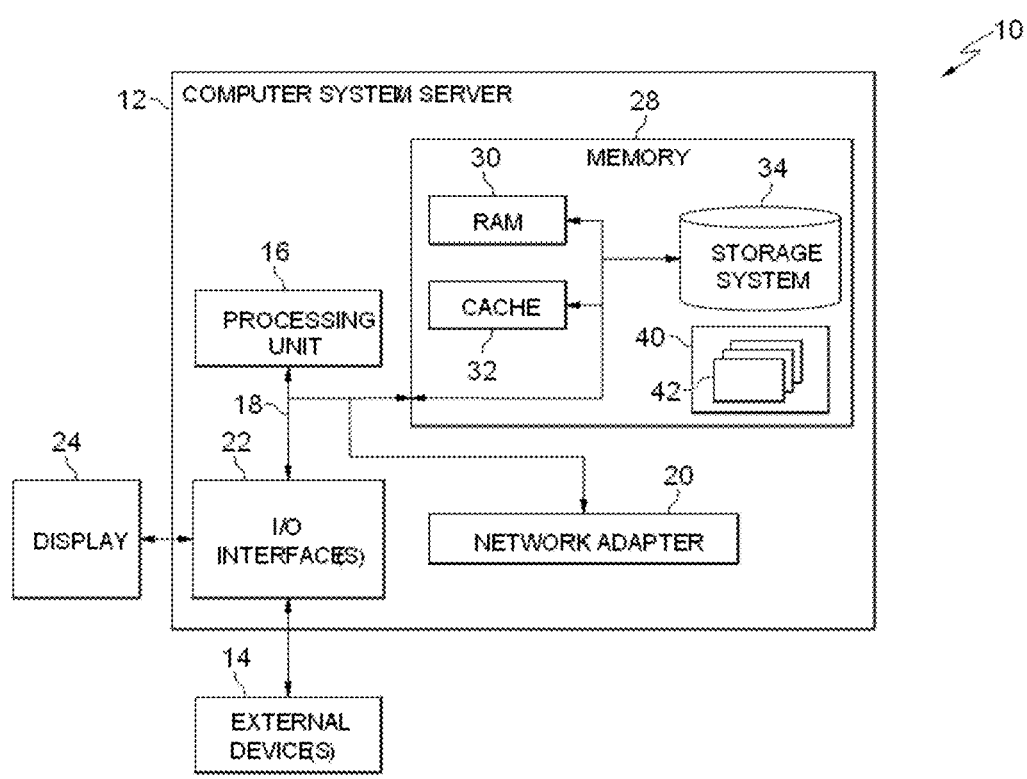
FIG. 1 shows an exemplary computer system which is applicable to implement the embodiments of the present disclosure.

Referring now to FIG. 1, in which an exemplary computer system/server 12 which is applicable to implement the embodiments of the present disclosure is shown. Computer system/server 12 is only illustrative and is not intended to apply any limitation as to the scope of use or functionality of embodiments of the disclosure described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA)

bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a portable compact disc read-only memory (CD-ROM), a digital versatile disk (DVD), or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 3:
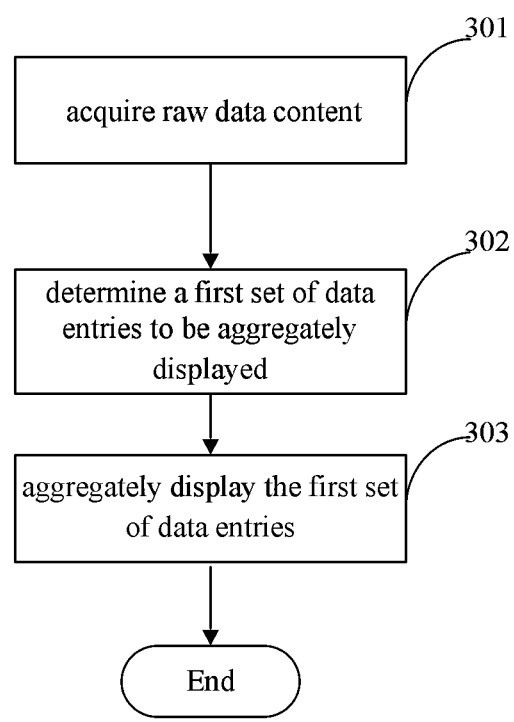
FIG. 3 shows a flowchart of a data display method according to an embodiment.

Before the introduction of FIG. 3, some technical terms used herein will be defined at first. Unless otherwise particularly specified, the following technical terms herein have meanings defined as follows:

As used herein, the term a "data entry" refers to a data item of content or a data unit or any part of data content that may be regarded as a check unit/object. For data in the form of a table, a data entry may be a data row or a set of data rows. For data in the form of text, a data entry may be a text line, a paragraph or a text unit divided in any manner. For data of text in some specific formation, data entries may be divided in a specific manner. For example, for code text of software, a data entry may be a code segment or a code segment that is divided according to a specific parameter.

As used herein, the term "a set of data entries" refers to a set comprising one or more data entries.

As used herein, the term "display" refers to displaying data on any display devices (including but not limited to computer, mobile phone, or any device having a display function).

As used herein, the term "aggregate display" refers to collectively displaying data entries of a set of related data entries, wherein the collective displaying method includes but is not limited to displaying side by side or in parallel in an original display area, or collectively displaying in a separate display area. Any displaying method allowing intuitive check and comparison of data entries that are displayed may be conceived as "aggregate display".

Referring to FIG. 3, FIG. 3 shows a flowchart of a data display method according to an embodiment of this disclosure.

The method shown in FIG. 3 begins at block 301. At block 301, raw data content is acquired. The data may comprise text, table, code, and information that may take any other form and is carried by any specific application. According to an embodiment of this disclosure, acquiring raw data content at block 301 comprises opening a data file with a specific application program. The data table shown in FIG. 2 may be considered as an example of the acquired raw data content.

Next, the method shown in FIG. 3 proceeds to block 302 to determine a first set of data entries to be aggregately displayed.

According to an embodiment of this disclosure, determining a first set of data entries to be aggregately displayed comprises: in response to selecting specified data entries, determining the selected data entries as the first set of data entries to be aggregately displayed from the raw data content. For example, if a user wants to compare data of each January in 1990, 2001, 2008 contained in the raw data content shown in FIG. 2, the user may select these three data rows (data entries) from the raw data content. At block 302, the three selected data rows are determined as the first set of data entries for aggregate display.

According to another embodiment of this disclosure, determining a first set of data entries to be aggregately displayed comprises: according to predetermined meta information, determining a first set of data entries to be aggregately displayed from the raw data content. For example, the predetermined meta information may be "Year: 1990, 2001, 2008, Month: January", thereby data rows of January in 1990, 2001, 2008 shown in FIG. 2 may be determined as the first set of data entries to be aggregately displayed from the raw data content. The predetermined meta information illustrated herein is only for the sense of explanation, and is by no means a limitation to the particular form of the meta information. Those skilled in the art may appreciate that meta information may be predetermined in a human-machine interactive manner, or may be defined by rule code written in advance, so long as the predetermined meta information may be identified and understood so as to determine the first set of data entries. With the predetermined meta information, it is not required for the user to select data entries to be aggregately displayed one by one from the raw data content.

According to yet another embodiment of this disclosure, a visual tag may be added to the first set of data entries to be aggregately displayed. The visual tag may take many forms, including but not limited to, a tack or a tag used for bold-faced data entries or a varied color, which may be conceived as the tag of this disclosure, so long as the data entries may be identified with the tag. For example, in the case of selecting data entries by a user, the selected data entries are determined as the first set of data entries to be aggregately displayed from the raw data content, and a visual tag is added to these selected data entries. In the case of determining the first set of data entries to be aggregately displayed by means of predetermined meta information, it is also possible to automatically add a visual tag to the determined first set of data entries. Those skilled in the art may appreciate that adding the visual tag may be for the purpose of intuitively identifying which data entries are determined as the first set of data entries. It is also applicable to not provide the tag at all, so long as it may be determined which data entries belong to the first set of data entries.

Figure 5A:
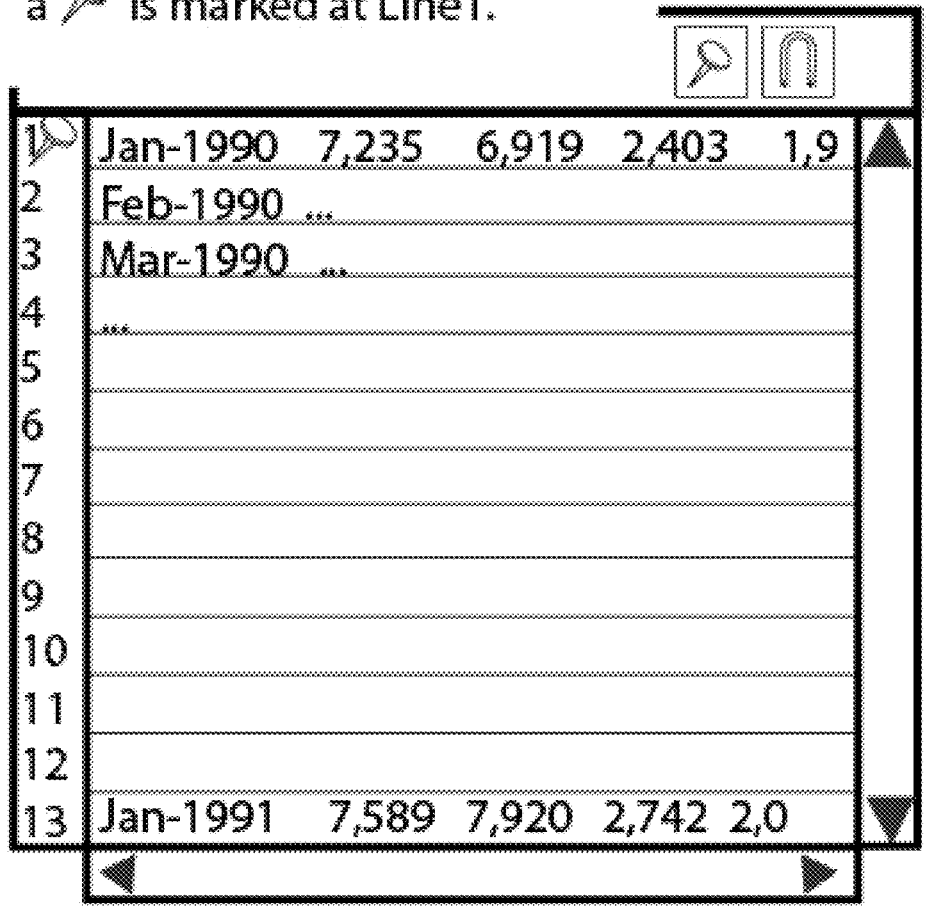
Figure 5B:

Various operations of FIG. 3 may be better understood in conjunction with FIGS. 5A-I. As shown in FIG. 5A, a data row of January, 1990 (data row 1) is selected as one of data entries to be aggregately displayed. A user may select that data row through clicking on a "tack" tag. Likewise, as shown in FIGS. 5A-B, the user also may select row 133 (corresponding to the data row of January, 2001) and row 217 (corresponding to the data row of January, 2008) as data entries of the first set of data entries to be aggregately displayed.

Also, as shown in FIG. 5E, an embodiment related to code text is shown. In FIG. 5E, a keyword "animate" is predetermined as meta information to determine all function code segments containing "animate" as the first set of data entries to be aggregately displayed.

Next, the method shown in FIG. 3 proceeds to block 303, where in response to a request for aggregate display, the first set of data entries is aggregately displayed. According to an embodiment of this disclosure, the request for aggregate display may be triggered by a user in a particular manner, for example, through clicking on a particular button to send a request for aggregate display. According to an embodiment of this disclosure, aggregately displaying the first set of data entries comprises displaying the data entries of the first set of data entries in a new display area. According to another embodiment of this disclosure, aggregately displaying the first set of data entries comprises displaying the data entries of the first set of data entries in the display area of the raw data file while hiding data entries that are not in the first set of data entries. Those skilled in the art may appreciate that aggregate display may be realized in many manners and may be different for various particular applications, all of which should be conceived as aggregate display so long as the purpose of collectively displaying data entries of the first set of data entries may be achieved. Further, it will be noted that the aggregate display of the first set of data entries does can include a modification to the raw data content, or data entries that do not belong to the first set of data entries may be hidden. Certainly, data entries that do not belong to the first set of data entries may also be deleted directly for the aggregate display.

Figure 5C:
Figure 5C:
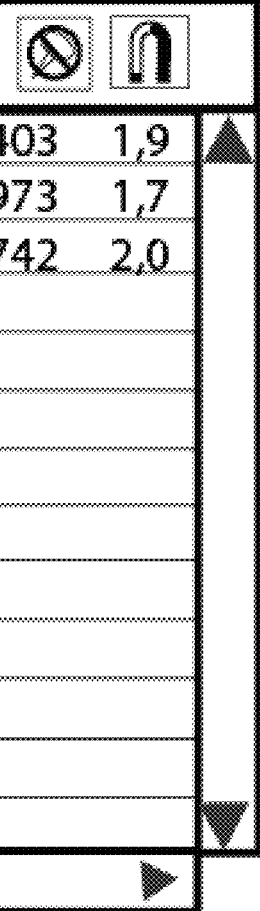

As shown in FIG. 5C, a user may click on a "magnet" button to send a request for aggregate display. In response to that request, rows 1, 133, 217 (data entries that are selected as shown in FIGS. 5A and 5B) are displayed aggregately. Data entries of January in 1990, 2001, 2008 that are selected may be compared intuitively as shown in FIG. 5C.

Figure 5D:
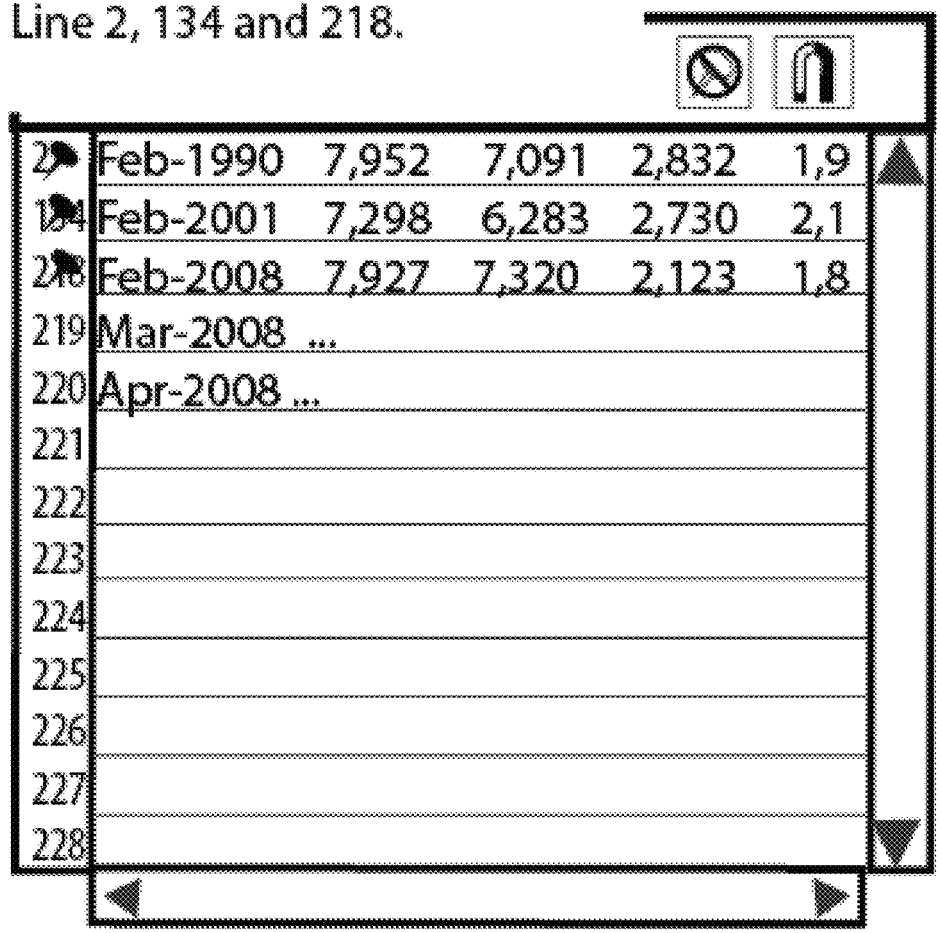

As shown in FIG. 5F, according to the meta information predetermined in FIG. 5D and in response to the request for aggregate display, function code segments containing "animate" may be automatically identified and aggregately displayed.

Figure 4:
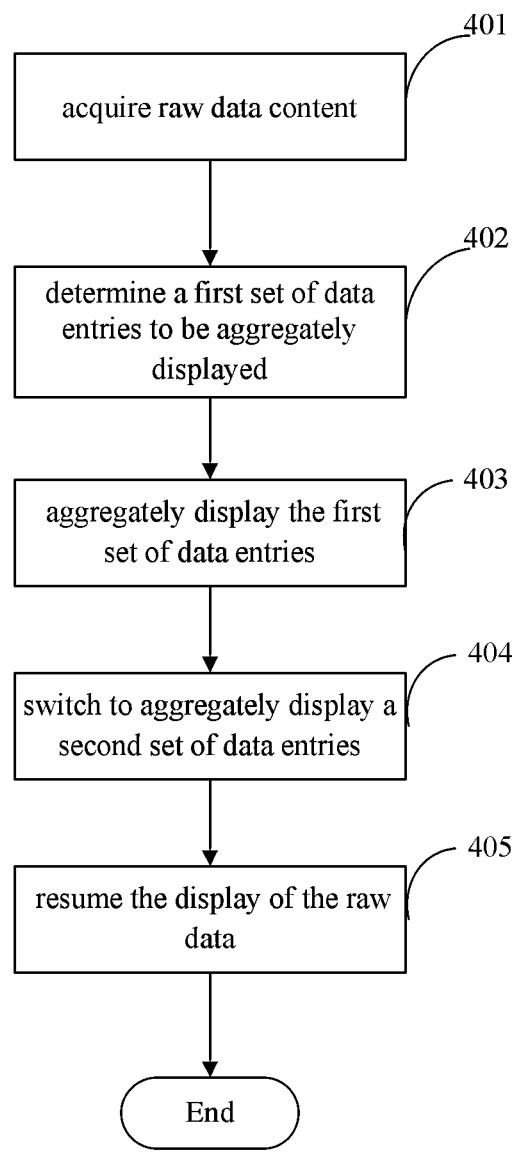
FIG. 4 shows another flowchart of a data display method according to an embodiment.

FIG. 4 shows a flowchart of a method for displaying user data according to another embodiment of this disclosure. It may be appreciated that blocks 401 to 403 of FIG. 4 correspond to blocks 301 to 303 of FIG. 3, and the explanations thereof will be omitted herein.

At block 404, in response to the request for a switch of displayed data entries, a second set of data entries is aggregately displayed, which comprises data entries adjacent to the data entries of the first set of data entries. Taking FIG. 2 as an example, if data rows of January in 1990, 2001, 2008 are aggregately displayed at block 403 (i.e., block 303), it is likely to compare data of February and various subsequent months in these three years one by one, thus a request for switching data entries to be displayed may be sent. The request may be sent by a user through clicking on a particular button or may be sent by a user through a scrollbar drag event. There is no any particular limitation to the way of sending the request. In response to the request herein, the aggregately displayed data entries are switched from data rows of January in 1990, 2001, 2008 (the first set of data entries) to data rows of February in these three years (the second set of data entries). Thus, although only data entries of January in these three years are determined as the first set of data entries to be aggregately displayed at block 402 (i.e., block 302), the aggregate display may be automatically switched to data entries adjacent to the data entries of the first set of data entries through the switch method described above.

In the table embodiment shown in FIG. 5D, a request for switching data entries to be displayed may be sent when a user clicks on the right scrollbar. In response to the request, the aggregate display is switched to a second set of data entries in FIG. 5D, i.e., data entries of rows 2, 134, 218, which correspond to data rows of February in 1990, 2001, 2008 respectively.

In the code text embodiment shown in FIG. 5G, a request for switching data entries to be displayed may be sent when a user clicks on the right scrollbar. In response to the request, the aggregate display is switched to a second set of data entries in FIG. 5H, i.e., code segments each containing a first component "element" of the "animate" function.

It should be noted that the method of determining "adjacent data entries" may differ for different data types. As to the data table of FIG. 2, for example, the adjacent data entry may be a next data row. For example, the data row adjacent to the data row of January 1990 is obviously the data row of February 1990. As to data in text format, if a text segment is considered as a data entry, the adjacent data entry may be a previous or next text segment. According to another embodiment of this disclosure, "adjacent data entry" may comprise the case of separating by several data entries, rather than, as in the conventional sense, immediately adjacent. In this case, "adjacent data entries" may be determined through specifying a switch operation.

According to an embodiment of this disclosure, in response to a request for switching data entries to be displayed, aggregately displaying the second set of data entries comprises: in response to the request for switching data entries to be displayed, according to a predetermined switch operation, aggregately displaying the second set of data entries. Herein, the switch operation refers to the distance for a next data entry from the present data entry. For example, as to the data table shown in FIG. 2, if we want to compare data of January, April, July, November in three years 1990, 2001, 2008, a switch operation of "3 data rows" (i.e., 3 months) may be predetermined. Thus, in response to the switch request, data of April, July, November in these three years may be automatically displayed in an aggregate manner without data rows of February, March, etc. For data in text format, the switch operation may be, for example, "2 text segments", "3 sentences" or "text segments having a specific keyword as the first word", and the like. The switch operation may be defined by a user in according to specific needs without any limitation thereof.

According to another embodiment of this disclosure, aggregately displaying the first set of data entries in response to a request for aggregate display further comprises: according to a specified aggregate display capacity, aggregately displaying the first set of data entries. It should be appreciated that, when switching to the aggregate display of the second set of data entries, it also may be aggregately displayed according to the specified aggregate display capacity. For the code text embodiment shown in FIG. 5H, when switching to display "element" components of "animate" functions, an aggregate display capacity of 5 lines may be specified. In response to this setting, for each "element" component, "5 lines" content is aggregately displayed as the capacity of each data entry of the second set of data entries. The final aggregate display result is shown in FIG. 5I.

It should be noted that block 404 may or may not contribute to the effects of this disclosure. In this regard, the effects of this disclosure can be realized even if the first set of data entries determined at block 402 (i.e., block 302) is aggregately displayed, without switching to the aggregate display of the second set of data entries.

Next, the method shown in FIG. 4 proceeds to block 405, in which raw data content is displayed in response to a request for resuming raw data content. According to an embodiment of this disclosure, a user may send a resumption request through clicking on a specific button. Because data entries that are not aggregately displayed may not be deleted while some specific data entries are aggregately displayed, the display of the raw data content may be resumed. It should be noted that while block 405 may or may not be included in the implementation of this disclosure, the effects of this disclosure may be achieved if all data entries that are not aggregately displayed are deleted and thereby the display of the raw data content may not be resumed, so long as the first set of data entries may be aggregately displayed.

It also should be noted that the sequence of blocks 405 and 404 is not fixed. That is, the display of the raw data content may be resumed in response to a request after the aggregate display of the first set of data entries, and then the second set of data entries may be aggregately displayed through switching. Alternatively, the aggregate display may be switched from the first set of data entries to the second set of data entries, after which the display of the raw data content may be resumed.

Figure 6:
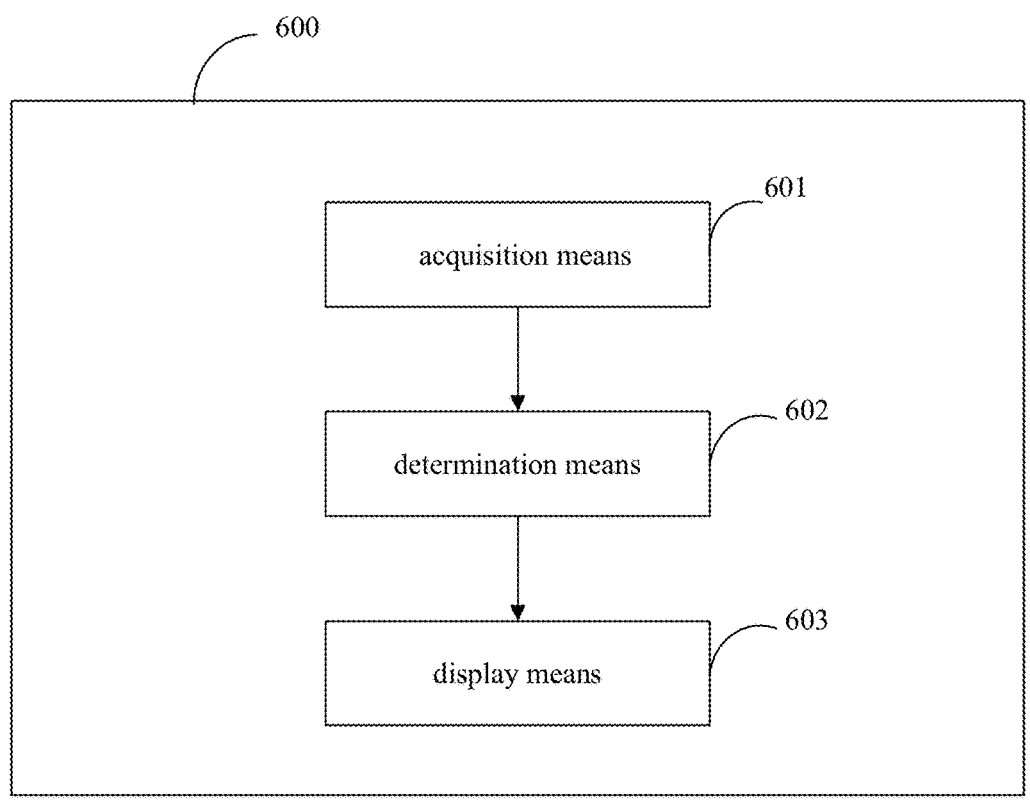
FIG. 6 shows a block diagram of a data display system according to an embodiment.

FIG. 6 shows a system for data display according to an embodiment of this disclosure. The system shown in FIG. 6 is generally represented by a system 600. Particularly, the system 600 comprises an acquisition means 601, configured to acquire raw data content; a determination means 602, configured to determine a first set of data entries to be aggregately displayed from the raw data content; and a display means 603, configured to aggregately display the first set of data entries in response to a request for aggregate display. It should be appreciated that means 601-603 of the system 600 correspond to blocks 301-303 of the method shown in FIG. 3, and the details explanations thereof will be omitted herein.

In view of the above, embodiments include a system, a method, and/or a computer program product for intuitively displaying data entries (content) that are required from mass data based on a requirement for data analysis. A further effect of the present disclosure is to enable the fast and flexible switch of the intuitive display described above in response to a change in requirement. The above effects are may be realized alternatively or simultaneously according to different embodiments of this disclosure.

The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for data display to enable a switching operation in response to requirement changes, comprising:
    acquiring raw data content;
    determining a first set of data entries to be aggregately displayed from the raw data content based on one or more specific data entries of the raw data content being selected via a tack operation, the one or more specific data entries comprising one or more first data rows;
    aggregately displaying the first set of data entries when a request for an aggregate display is received, wherein a selection of a magnet operation causes the request for the aggregate display, wherein aggregately displaying the first set of data entries comprises deleting all data entries that are not aggregately displayed and thereby a full display of the raw data content may not be resumed;
    receiving a request for the switching operation that causes a second set of data entries to be aggregately displayed from the raw data content in place of the first set of data entries, the second set of data entries comprising one or more subsequent data entries that are adjacent to the one or more specific data entries, wherein the request for the switching operation comprises a scrollbar drag operation including a clicked scrollbar; and
    displaying a portion of the raw data content that excludes the deleted data entries when a request for resuming the raw data content is received.

2. The method according to claim 1, wherein the determining of the first set of data entries to be aggregately displayed from the raw data content comprises:
    according to predetermined meta information, determining the first set of data entries to be aggregately displayed from the raw data content.

3. The method according to claim 1, further comprising: adding a visual tag to the first set of data entries.

4. A system for data display to enable a switching operation in response to requirement changes, the system comprising:
    a memory storing program instructions thereon,
    a processor coupled to the memory, the processor configured to execute the program instruction to cause the system to:
        acquire raw data content;
        determine a first set of data entries to be aggregately displayed from the raw data content based on one or more specific data entries of the raw data content being selected via a tack operation from the raw data content, wherein the one or more specific data entries comprise one or more first data rows;

aggregately display the first set of data entries when a request for an aggregate display is received, wherein a selection of a magnet operation causes the request for the aggregate display, wherein aggregately displaying the first set of data entries comprises deleting all data entries that are not aggregately displayed and thereby a full display of the raw data content may not be resumed;

receiving a request for the switching operation that causes a second set of data entries to be aggregately displayed from the raw data content in place of the first set of data entries, the second set of data entries comprising one or more subsequent data entries that are adjacent to the one or more specific data entries, wherein the request for the switching operation comprises a scrollbar drag operation including a clicked scrollbar; and display a portion of the raw data content that excludes the deleted data entries when a request for resuming the raw data content is received.

5. The system according to claim 4, wherein the processor is configured to execute the program instruction to cause the system to:

according to predetermined meta information, determine the first set of data entries to be aggregately displayed from the raw data content.

6. The system according to claim 4, wherein the processor is configured to execute the program instruction to cause the system to:

add a visual tag to the first set of data entries.

7. A computer program product for data display, the computer program product comprising a non-transitory computer readable storage medium having program instructions for data display to enable a switching operation in response to requirement changes embodied therewith, the program instructions executable by a processor to cause the processor to perform:

acquiring raw data content;

determining a first set of data entries to be aggregately displayed from the raw data content based on one or more specific data entries of the raw data content being selected via a tack operation from the raw data content, wherein the one or more specific data entries comprise one or more first data rows, wherein aggregately displaying the first set of data entries comprises deleting all data entries that are not aggregately displayed and thereby a full display of the raw data content may not be resumed;

aggregately displaying the first set of data entries when a request for an aggregate display is received, wherein a selection of a magnet operation causes the request for the aggregate display;

receiving a request for the switching operation that causes a second set of data entries to be aggregately displayed from the raw data content in place of the first set of data entries, the second set of data entries comprising one or more subsequent data entries that are adjacent to the one or more specific data entries, wherein the request for the switching operation comprises a scrollbar drag operation including a clicked scrollbar; and display a portion of the raw data content that excludes the deleted data entries when a request for resuming the raw data content is received.

8. The computer program product according to claim 7, wherein the program instructions executable by the processor with respect to the determining of the first set of data entries to be aggregately displayed from the raw data content cause the processor to perform:

according to predetermined meta information, determining the first set of data entries to be aggregately displayed from the raw data content.

9. The computer program product according to claim 7, the program instructions executable by the processor to cause the processor to perform:

adding a visual tag to the first set of data entries.

* * * * *